June 30, 1925.                      1,543,973
C. E. ADAMS ET AL
ILLUMINATED INSTRUMENT
Filed May 23, 1922
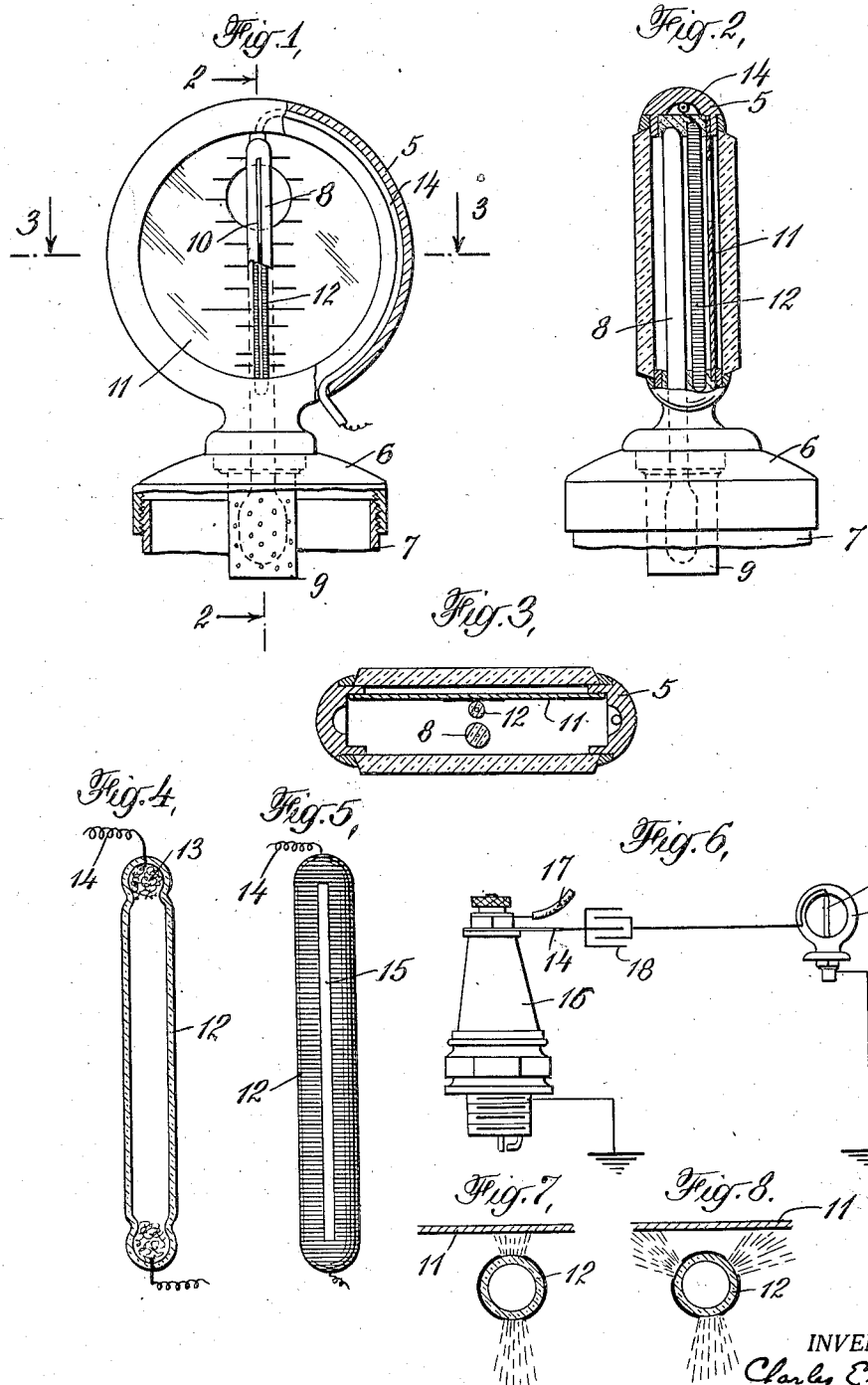
INVENTOR
Charles E. Adams
and Floyd J. Metzger
BY
Pennie Davis Marvin & Edmonds
their ATTORNEYS Patented June 30, 1925.

1,543,973

UNITED STATES PATENT OFFICE.

CHARLES E. ADAMS AND FLOYD J. METZGER, OF NEW YORK, N. Y., ASSIGNORS TO AIR REDUCTION COMPANY, INCORPORATED, A CORPORATION OF NEW YORK.

ILLUMINATED INSTRUMENT.

Application filed May 23, 1922. Serial No. 562,976.

*To all whom it may concern:*

Be it known that we, CHARLES E. ADAMS, a citizen of the United States, residing at New York city, in the county of New York, State of New York, and FLOYD J. METZGER, a citizen of the United States, residing at New York city, in the county of New York, State of New York, have invented certain new and useful Improvements in Illuminated Instruments; and we do hereby declare the following to be a full, clear, and exact description of the invention, such as will enable others skilled in the art to which it appertains to make and use the same.

This invention relates to temperature and pressure gauges, and particularly to the illumination of instruments of this character whereby readings therefrom may be taken at night or when the instrument is otherwise obscured by darkness.

A special application of the invention is in illuminating thermometers such as are employed to indicate the temperature of the surrounding liquid in cooling systems for internal combustion engines. It is to be observed, however, that the invention is not limited to such use, being applicable generally to thermometers and barometers and to other measuring instruments.

Temperature-responsive devices for indicating a rise in temperature in the circulating cooling medium of auto-motive engines are in common use. The utility of such devices is limited, however, because they are generally supported on the radiator cap of the vehicle and are not, therefore, visible at night. Attempts have been made to illuminate the temperature indicator which is ordinarily a thermometer, but the suggested devices are not satisfactory, particularly because of the distracting effect of the light on the driver of the vehicle and partly because of the disfigurement of the vehicle by the means employed.

It is the object of the present invention to provide a self-contained and compact illuminated indicating instrument which is inexpensive and effective.

A further object of the invention is the provision of a temperature indicator for the cooling system of an internal combustion engine which is electrically illuminated with a minimum expenditure of current and particularly with current derived from the ignition system of the engine.

Further objects and advantages of the invention will be apparent as it is better understood by reference to the following specification and accompanying drawing, in which Fig. 1 is a front elevation, partially in section, of an adaptation of the invention;

Fig. 2 is a section on the line 2—2 of Fig. 1;

Fig. 3 is a plan section on the line 3—3 of Fig. 1;

Fig. 4 is an enlarged sectional view of the illuminating device;

Fig. 5 is a front elevation of the illuminating device;

Fig. 6 is a diagrammatic illustration of a suitable electrical circuit; and

Figs. 7 and 8 are diagrammatic illustrations of certain modifications of the invention.

The invention depends upon the use of a gaseous medium having a high electrical conductivity or low dielectric strength whereby an electrical discharge resulting from the passage of a high tension current through the gas causes illumination thereof. Neon or helium is preferably employed because of their relatively high electrical conductivity, but other gases such as air under very reduced pressures or carbon dioxide, nitrogen or argon under reduced pressures may be used. In the practical application of the invention neon under a pressure of about twenty millimeters is preferred. The gaseous medium is disposed in a receptacle or vessel, preferably a glow tube of transparent or translucent material such as glass, and the tube is disposed in close proximity behind and in alignment with a thermometer tube. When the tube is illuminated by the passage of current therethrough, the thermometer tube and particularly the indicator column thereof is thrown into relief and is readily visible at night. Preferably the glow tube is rendered opaque by a suitable coating or otherwise except for a transparent portion or portions extending lengthwise thereof. Diffusion of the light is thus prevented and the thermometer tube is more sharply defined.

Referring to the drawing, 5 indicates a frame adapted to be secured in any suitable manner to a radiator cap 6 which closes the filling spout 7 of an automobile radiator. A thermometer 8 is supported in the frame. The lower end of the thermometer containing a temperature-responsive fluid such as mercury or xylol or alcohol is disposed within a protecting casing 9 which depends in the filling spout above the circulating cooling liquid. The thermometer tube is provided with a bore 10, as is usual, in which the temperature-responsive fluid rises as the temperature increases. Behind the thermometer a scale 11 is provided whereby the position of the fluid in the bore of the thermometer may be interpreted.

A tube 12 is mounted between the thermometer and the scale in close proximity to the former. This tube contains a gas, neon for example, under a pressure preferably of about twenty millimeters. The pressure of the gas may vary widely, and if gases other than neon are used the pressure must be further reduced to decrease the dielectric strength of the gas. The tube 12 is provided at its top with an electrode 13 projecting through the wall thereof and connected by a conductor 14 to a source of high tension current. Preferably the tube is coated with some opaque material so that it is transparent or translucent only along a narrow portion 15 which is directly behind the thermometer tube. The narrow light-transmitting portions may be on diametrically opposite sides of the tube as indicated in Fig. 7 so that both the thermometer and the scale are illuminated or the light-transmitting portions may be arranged at angles of approximately 120° or substantially on opposite sides of the tube for the same purpose.

The current may be derived from any suitable source such as an induction coil, but preferably when the indicator is used in connection with an internal combustion engine the current is supplied from the ignition system of the engine. Any of the high tension conductors of the system may be tapped, and preferably a condenser or choke coil is disposed in the circuit to limit the amount of current withdrawn. A satisfactory arrangement involves the connection of a condenser to a terminal of one of the spark plugs of the engine. Connections may, of course, be made with several spark plugs if desired. Thus the conductor 14 may be connected to a spark plug 16 supplied with high tension current by a conductor 17. A condenser 18 is arranged in the circuit for the purpose described. The surrounding metal parts of the frame 5, which is indicated as grounded by a conductor 19 on the vehicle, will serve to disperse the current which passes through the tube 12. It may be desirable to provide a further capacity medium at the lower end of the tube such as a coating of metal or a layer of material such as metal wool capable of exerting a capacity effect to disperse the current.

From the foregoing it will appear that we have provided a simple and self-contained illuminated instrument and that the illuminating means is capable of a variety of uses. The light emitted is sufficient for the purpose but is not so intense as to distract the driver when the device is applied to the vehicle.

Various changes may be made in the details of construction and arrangement of the parts without departing from the invention or sacrificing any of the advantages thereof.

We claim:—

1. In an illuminated instrument the combination of light-transmitting indicating means, a scale behind the indicating means, a glow vessel disposed between the scale and indicating means and means for delivering high tension current to the glow vessel.

2. In an illuminated instrument, the combination of light-transmitting indicating means, a scale behind the indicating means, a glow vessel disposed between the scale and the indicating means, said vessel having narrow light-transmitting portions at opposite sides thereof and means for delivering high tension current to the glow vessel.

3 In an illuminated device for indicating the temperature of the cooling system of an internal combustion engine, the combination of a frame, a temperature-responsive device mounted in the frame, a scale behind the temperature-responsive device and a glow vessel disposed between the scale and temperature-responsive device.

4. In an illuminated device for indicating the temperature of the cooling system of an internal combustion engine, the combination of a frame, a temperature-responsive device mounted in the frame, a scale behind the temperature-responsive device and a glow vessel disposed between the scale and temperature-responsive device, the glow vessel having narrow light-transmitting portions to direct the light upon the temperature-responsive device and scale.

In testimony whereof we affix our signatures.

CHARLES E. ADAMS.
FLOYD J. METZGER.